(12) United States Patent
Kliorin et al.

(10) Patent No.: US 7,738,710 B2
(45) Date of Patent: Jun. 15, 2010

(54) METHODS AND APPARATUS FOR COMMUNICATING AND DISPLAYING COMPRESSED IMAGE DATA

(75) Inventors: Victor Kliorin, Foster City, CA (US); Jonathan B. Marsden, San Mateo, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 899 days.

(21) Appl. No.: 10/909,713

(22) Filed: Aug. 2, 2004

(65) Prior Publication Data

US 2006/0023953 A1 Feb. 2, 2006

(51) Int. Cl.
G06K 9/36 (2006.01)
(52) U.S. Cl. .................. 382/232; 375/E7.187
(58) Field of Classification Search ........... 382/232; 375/E7.187
See application file for complete search history.

(56) References Cited

U.S. PATENT DOCUMENTS

| | | | | |
|---|---|---|---|---|
| 4,628,534 A | * | 12/1986 | Marshall | 382/299 |
| 5,408,328 A | * | 4/1995 | Boliek et al. | 382/233 |
| 5,659,634 A | * | 8/1997 | Yeh et al. | 382/232 |
| 5,867,598 A | | 2/1999 | de Queiroz | |
| 6,298,166 B1 | * | 10/2001 | Ratnakar et al. | 382/248 |
| 6,310,647 B1 | | 10/2001 | Parulski et al. | |
| 6,314,452 B1 | | 11/2001 | Dekel et al. | |
| 6,897,858 B1 | * | 5/2005 | Hashimoto et al. | 345/419 |
| 2003/0005140 A1 | | 1/2003 | Dekel et al. | |
| 2003/0059096 A1 | | 3/2003 | Dekel et al. | |

FOREIGN PATENT DOCUMENTS

| | | |
|---|---|---|
| EP | 0967788 A2 | 12/1999 |
| EP | 1037165 A2 | 9/2000 |

OTHER PUBLICATIONS

Martin Boliek et al.,"JPEG 2000 for Efficient Imaging in a Client/Server Environment," Proceedings of SPIE, vol. 4472, pp. 212-223, Jul. 31, 2001.
Athanassios Skodras et al.,"The JPEG 2000 Still Image Compression Standard," IEEE Signal Processing Magazine, pp. 36-58, Sep. 2001.
PCT/US2005/026956 Int'l Search Report & Written Opinion from Counterpart PCT Case, Nov. 25, 2005, Electronics for Imaging, Inc.
PCT/US2005/026956 Int'l Preliminary Examination Report from Counterpart PCT Case, Mar. 6, 2008, Electronics for Imaging, Inc.

* cited by examiner

*Primary Examiner*—Bhavesh M Mehta
*Assistant Examiner*—Stephen R Koziol
(74) *Attorney, Agent, or Firm*—Glenn Patent Group; Michael A. Glenn

(57) ABSTRACT

Methods and apparatus are provided for creating one or more compressed image tiles based on a compressed file that describes a digital image. In particular, the compressed image tiles are created without fully decompressing the compressed file. Each compressed image tile includes data corresponding to a portion of the digital image, and is independent of other compressed image tiles (i.e., may be decompressed without decompressing any other tile). In response to requests to display a desired portion of the digital image at a specific resolution, the compressed image tiles corresponding to the desired portion and the specified resolution are communicated via a band limited communication channel. In this regard, the portions of the digital image may be quickly communicated and displayed, without having to wait for the entire compressed file to be communicated over the band limited channel.

44 Claims, 12 Drawing Sheets

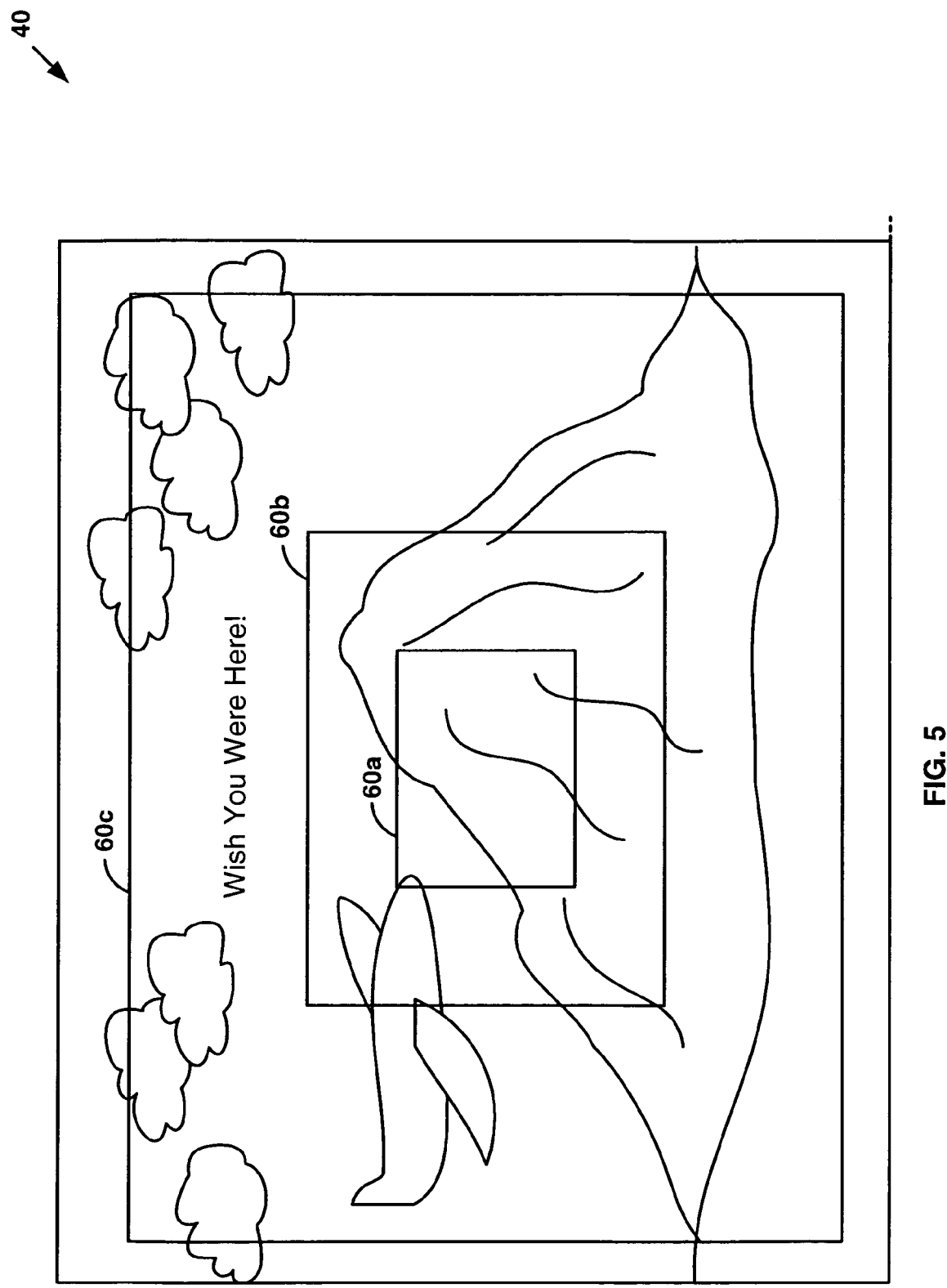

METHODS AND APPARATUS FOR COMMUNICATING AND DISPLAYING COMPRESSED IMAGE DATA

BACKGROUND

This invention relates to apparatus and methods for communicating and displaying image data, and more particularly relates to apparatus and methods for communicating and displaying compressed image data.

As digital image processing technology has advanced in recent years, documents and images are increasingly being created, stored and displayed electronically. Indeed, commonly available computer programs such as word processors, page layout, graphics arts, photo editing and other similar programs may be used to create, edit, save and display electronic documents and images (collectively referred to as "electronic documents"). In addition, commonly used electronic devices such as digital scanners, digital copiers and digital cameras may be used to create and save electronic documents. As a result, the number of electronic documents that are created each year grows at an extremely rapid rate.

Further, improvements in image processing technology have resulted in significant improvements in electronic document image quality. Indeed, electronic images are frequently created at resolutions of 1200 dots per inch ("dpi") or more. As image resolution has increased, the amount of data required to represent high quality images also has increased. For example, a single page containing an 8"×10" image having four color separations (e.g., cyan, magenta, yellow and black) and a resolution of 1200 dpi includes more than 109 mega-pixels for each color separation, and may include more than 436 mega-bytes ("MB") of data.

Because of the large amount of data required to represent high quality images, it is not practical to store such information in an uncompressed state. Thus, applications and devices that create and store high quality digital color images typically do so in a compressed format. In particular, as a result of the development of block compression standards such as JPEG (an acronym for "Joint Photographic Experts Group"), many digital imaging systems and applications create, convert, and/or maintain digital content in a JPEG compressed format (referred to herein as "JPEG data"). Depending on the image, it often is possible to achieve very high compression ratios. For example, the image described above that includes 436 MB of uncompressed data may be compressible to approximately 40 MB of JPEG data.

One such digital imaging system that converts and maintains digital content in compressed form is a digital printing system, an example of which is illustrated in FIG. 1. In particular, digital printing system 10 includes document source 12, print server 14, client computer 16 and printer 18. Document source 12 may be a personal computer, color scanner, electronic document archive, or other source of electronic documents 20, and print server 14 may be a conventional print server, such as those manufactured by Electronics for Imaging, Inc. (Foster City, Calif.) under the trademarks Fiery®, EDOX® and Splash®. Document source 12 provides electronic document 20 to print server 14 for printing on printer 18.

Electronic document 20 may include data in a page description language ("PDL"), such as PostScript, portable document format ("PDF"), page command language ("PCL") or other PDL. Print server 14 includes raster image processor ("RIP") 22 that converts electronic document 20 from PDL format to raster data in a compressed format. For example RIP 22 may convert the PDF data to block-compressed raster data (e.g., JPEG data) in compressed file 24, which may be stored in memory 26. To print the electronic document, RIP 22 may retrieve compressed file 24 from memory 26, decompress the file, and provide the decompressed raster data to printer 18 for printing.

Prior to printing, it often is desirable to display all or part of the raster image data contained in compressed file 24. For example, it may be desirable to display all or part of compressed file 24 on client computer 16 to visually proof the raster image data. Client computer 16 may be part of print server 14, or may be separate from print server 14. For example, print server 14 may be located at a printshop, and client computer 16 may be located at a customer office. Client computer 16 may communicate with print server 14 via communication channel 28, such as a local area network, wide area network, the Internet, or other similar network. Depending on the size of compressed file 24 and the bandwidth of communication channel 28, however, it may be impractically slow to transfer compressed file 24 to client computer 16 for display. For example, if compressed file 24 is a 40 MB file, and communication channel 28 is a conventional digital subscriber line ("DSL") or cable broadband connection, it may take more than ninety seconds or more to download and display the file on client computer 16.

To solve this bandwidth problem, some previously known digital printing systems create a reduced resolution (often referred to as a "thumbnail") image of the raster image data, and then transfer only the thumbnail image to client computer 16. Because the file size of the thumbnail image is much smaller than the size of compressed file 24, the download time is much faster than that required to transmit the entire compressed image file. Although the thumbnail image may be useful for verifying very general qualities of the image in compressed file 24, the resolution of the thumbnail image is typically insufficient for proofing purposes. Further, because the resolution of the thumbnail image is fixed, a user cannot zoom in or out to view the image at multiple resolutions.

Another previously known digital imaging system attempts to solve the limited bandwidth problem by encoding and communicating only a subset of high resolution image data. For example, Dekel et al. U.S. Pat. No. 6,314,452 ("Dekel") describes an imaging system that includes a server that encodes a region of interest ("ROI") of an uncompressed image, and then transmits only the compressed ROI data to a remote client computer via a communication network. This previously known technique assumes that a desired ROI is less than the entire image, and therefore the server only compresses and communicates data associated with the ROI. One problem with this technique, however, is that all of the image data are never entirely compressed. As a result, such systems are incompatible with digital imaging systems, such as digital printing system 10, that include print servers that compress and store all of the raster image data. In addition, because the Dekel system never compresses an entire image, the system requires very large storage devices.

In view of the foregoing, it would be desirable to provide methods and apparatus that allow fast communication and display of compressed raster image data.

It further would be desirable to provide methods and apparatus that allow fast communication and display of compressed raster image data at full resolution.

It additionally would be desirable to provide methods and apparatus that allow fast communication and display of compressed raster image data at multiple resolutions.

It also would be desirable to provide methods and apparatus that allow fast communication and display of raster image data that has been fully compressed.

SUMMARY

In view of the foregoing, it is an object of this invention to provide methods and apparatus that allow fast communication and display of compressed raster image data.

It further is an object of this invention to provide methods and apparatus that allow fast communication and display of compressed raster image data at full resolution.

It additionally is an object of this invention to provide methods and apparatus that allow fast communication and display of compressed raster image data at multiple resolutions.

It also is an object of this invention to provide methods and apparatus that allow fast communication and display of raster image data that has been fully compressed.

These and other objects of this invention are accomplished by providing a tile server that communicates with a client device via a band limited communication channel. The tile server creates one or more compressed image tiles based on a compressed file that describes a digital image. In particular, the tile server creates the compressed image tiles without fully decompressing the compressed file. Each compressed image tile includes data corresponding to a portion of the digital image, and is independent of other compressed image tiles (i.e., may be decompressed without decompressing any other tile). In response to requests from a viewer application running on the client device to display a desired portion of the digital image at a specific resolution, the tile server provides compressed image tiles corresponding to the desired portion and the specified resolution to the viewer application via the communication channel. In this regard, the client device may quickly receive and display portions of the digital image, without having to wait for the entire compressed file to be communicated over the band limited channel.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which:

FIG. 5 is a depiction of exemplary portions of the digital image of FIG. 3;

DETAILED DESCRIPTION

Figure 1:
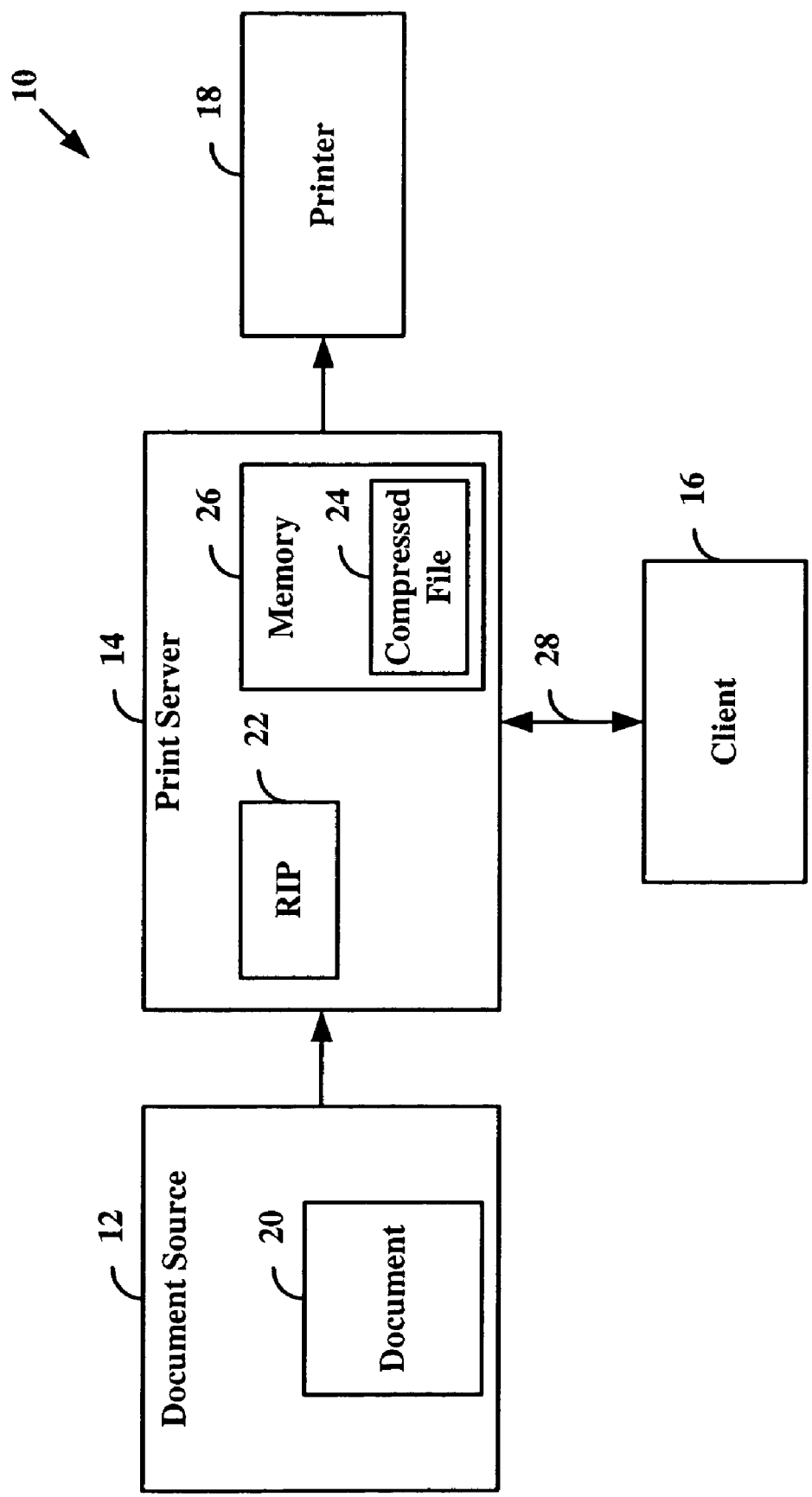
FIG. 1 is a block diagram of a previously known digital printing system.
Figure 2:
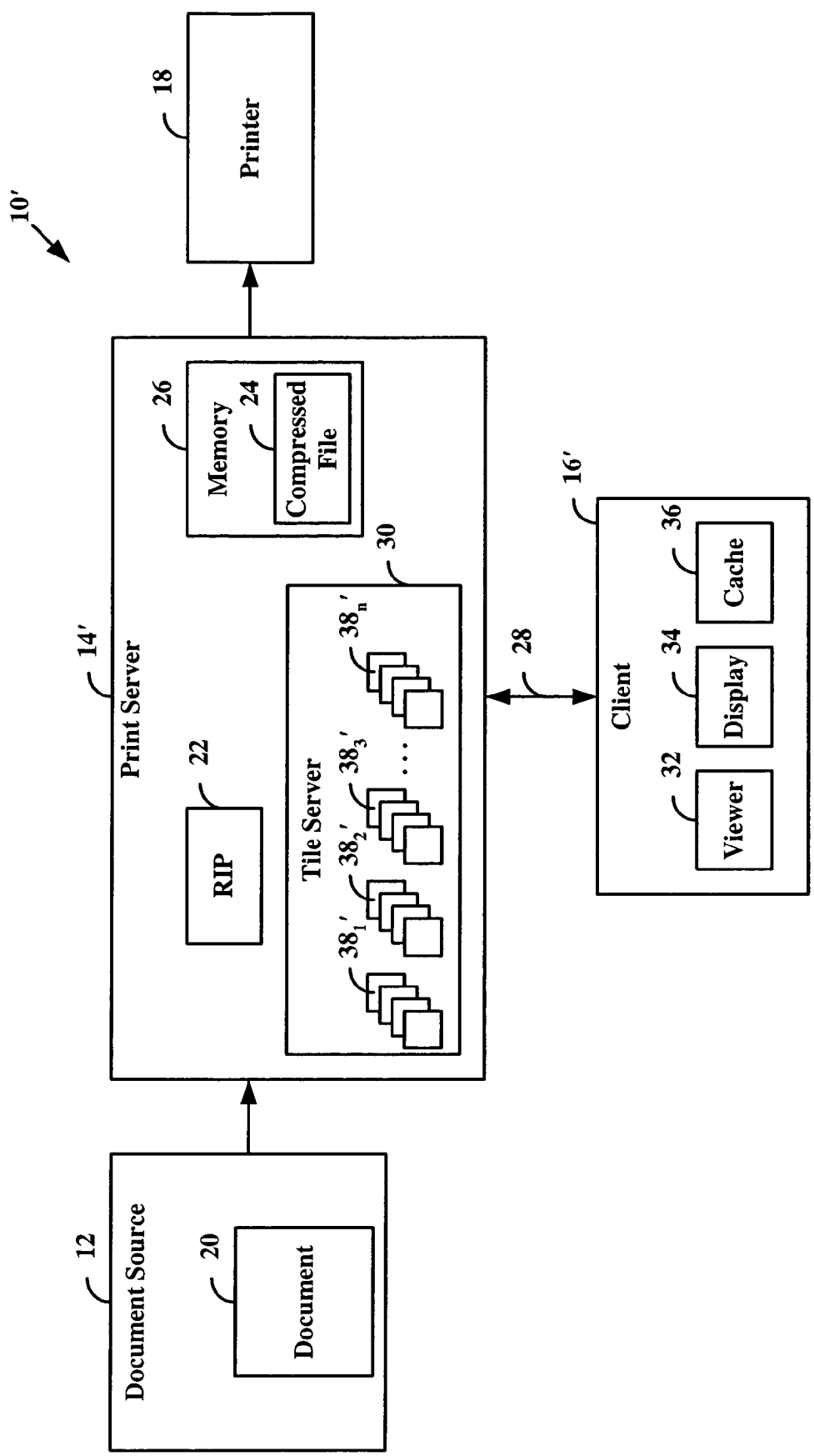
FIG. 2 is a block diagram of an exemplary embodiment of a digital printing system in accordance with this invention.

Referring to FIG. 2, an exemplary digital imaging system in accordance with this invention is described. Digital imaging system 10' includes print server 14' and client 16', which includes viewer application 32, display device 34 and cache 36. Print server 14' may be a Fiery, EDOX or Splash print server, or other similar device, and includes tile server 30. In response to a request by a user of client 16' to display the digital image described in compressed file 24, tile server 30 creates one or more compressed image tiles $38_1'$, $38_2'$, . . . , $38_n'$ based on compressed file 24, wherein each compressed image tile includes data corresponding to a portion of the digital image. In particular, tile server 30 creates one or more compressed image tiles $38_1'$, $38_2'$, . . . , $38_n'$ without fully decompressing compressed file 24. Moreover, each compressed image tile 38' is independent (i.e., may be decompressed without decompressing any other tile). In response to requests from viewer application 32 to display a desired portion of the digital image at a specific resolution, tile server 30 provides compressed image tiles 38' that correspond to the desired portion and the specified resolution to client 16' via communication channel 28 for display on display device 34. In this regard, client 16' may quickly receive and display portions of the digital image, without having to wait for the entire compressed file to be received from print server 14'.

Figure 3:
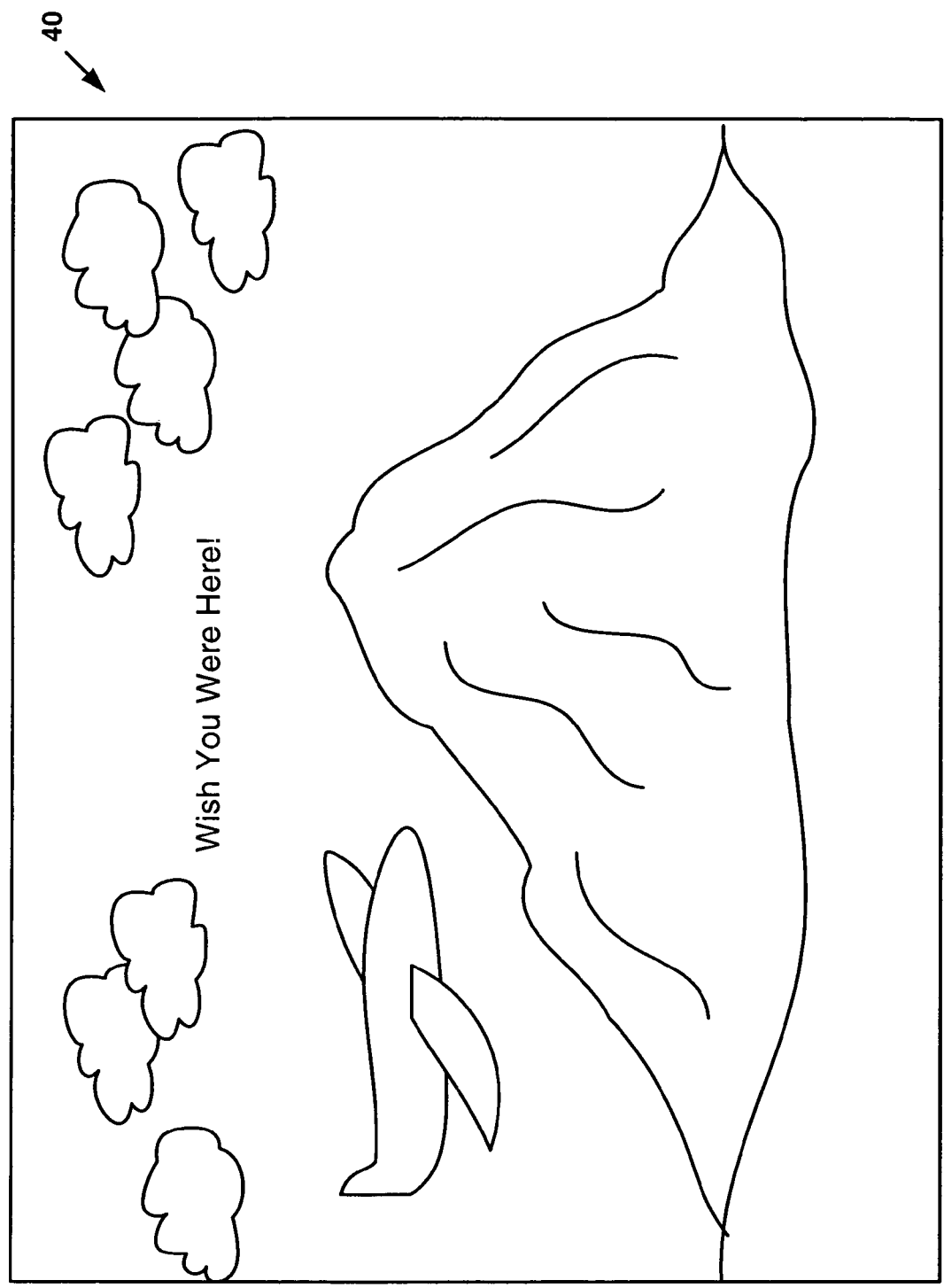
FIG. 3 is an exemplary digital image for use with methods and apparatus in accordance with this invention.

Referring now to FIGS. 2 and 3, an exemplary digital image is described for use with methods and apparatus in accordance with this invention. Digital image 40 may be included in electronic document 20, which may be sent by document source 12 to print server 14'. RIP 22 may then convert and store electronic document 20 as compressed raster data in compressed file 24. For example, RIP 22 may compress digital image 40 using a block compression technique, such as JPEG compression. In raster form, digital image 40 includes an array of pixels (e.g., a 4512×3584 array of pixels).

Figure 4:
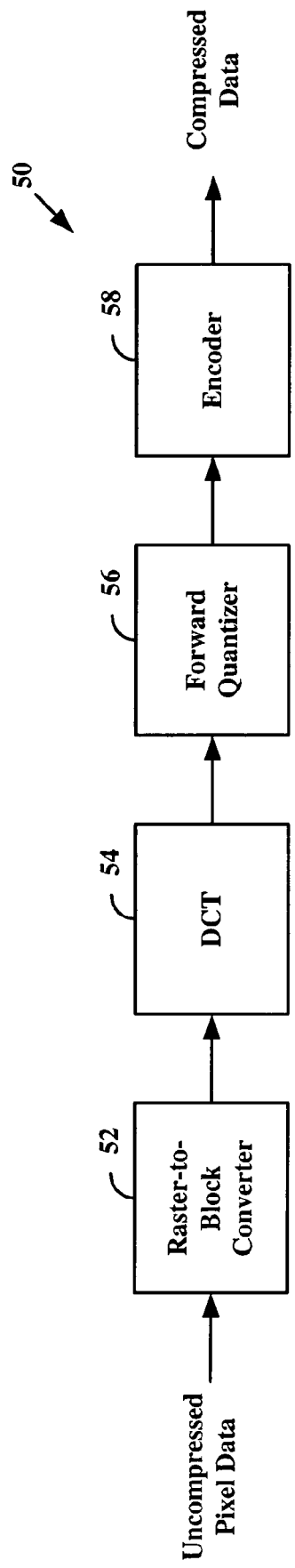
FIG. 4 is an exemplary block compression technique for use with methods and apparatus in accordance with this invention.

An exemplary JPEG compression technique 50 that may be used by RIP 22 to compress digital image 40 is illustrated in FIG. 4. At stage 52, uncompressed raster (pixel) data are grouped into blocks, with each block including an 8×8 array of pixels. At step 54, the pixel data in each block are transformed using a discrete cosine transformation ("DCT") to form an 8×8 array of DCT coefficients. At step 56, the coefficients in each block are quantized. Finally, at step 58, the quantized DCT coefficients are encoded using Huffman encoding to form compressed data. Persons of ordinary skill in the art will understand that RIP 22 may use other similar block compression techniques to compress digital image 40.

Referring again to FIG. 2, a user of client 16' may want to display all or a portion of digital image 40 on display device 34, which may be a cathode ray tube, liquid crystal display, plasma display, or other similar display device. For example, a user may wish to proof digital image 40 prior to printing the image on printer 18. To do so, it may be desirable to display digital image 40 on display device 34. At full resolution (i.e., 1:1), only a portion of the image may be visible on the display. For example, as illustrated in FIG. 5, if digital image 40 includes 4512×3584 pixels, and display device 34 includes 1024×768 pixels, at full resolution, display device 34 displays a portion of digital image 40, such as portion 60a. In contrast, at lower resolutions (e.g., 1:2, 1:4), display device 34 may display larger portions of digital image 40, such as portions 60b and 60c.

Referring again to FIG. 2, in response to a request by a user of client 16' to display a desired portion (e.g., 60a, 60b or 60c) of digital image 40 on display device 34, tile server 30 may divide digital image 40 into a plurality of tiles, in which each tile includes a subset of the pixels of the entire image, tile server 30 may identify the tiles corresponding to desired portion, and may then communicate pixel data for the identified tiles to client 16' and displayed on display device 34. For improved efficiency, tile server 30 may compress the tiles prior to communication. In particular, tile server 30 may create one or more compressed image tiles 38' based on compressed file 24, wherein each compressed image tile 38' includes compressed data corresponding to a portion of the digital image described in compressed file 24. Tile server 30 may then communicate compressed image tiles 38' corresponding to the desired portion to client 16', which may decompress the tiles and display the data on display device 34.

To further improve efficiency, tile server 30 may create compressed image tiles 38' without fully decompressing compressed file 24. Further, tile server 30 may create compressed image tiles 38' that are independent (i.e., may be decompressed without decompressing any other tile). To facilitate an understanding of this invention, the following sections first describe image tiling of uncompressed image data, and then describe methods in accordance with this invention for creating independent compressed image tiles 38' without fully decompressing compressed file 24.

Figure 6A:
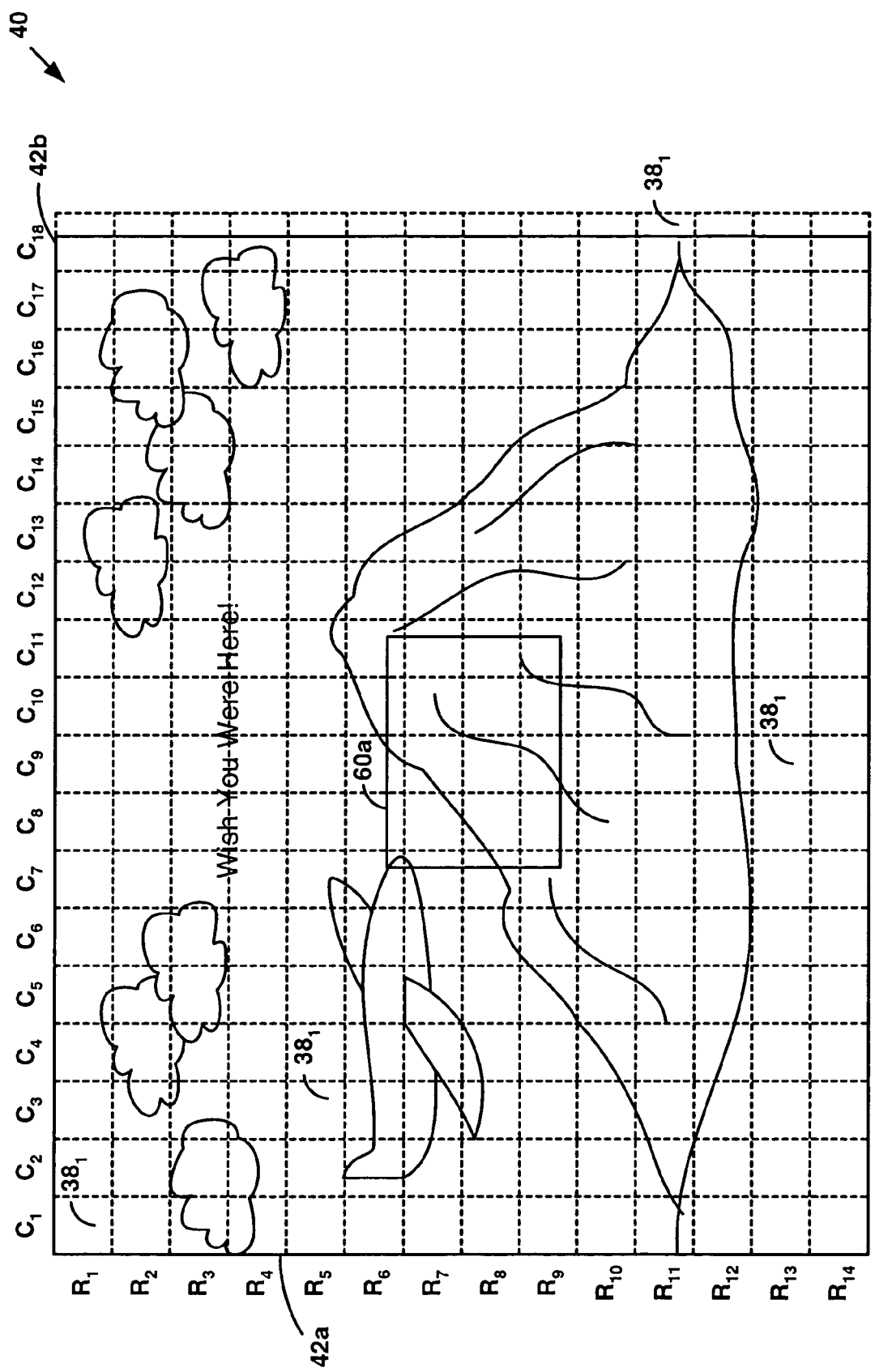
FIGS. 6A-6C are exemplary tiled representations of the digital image of FIG. 3.
Figure 6B:
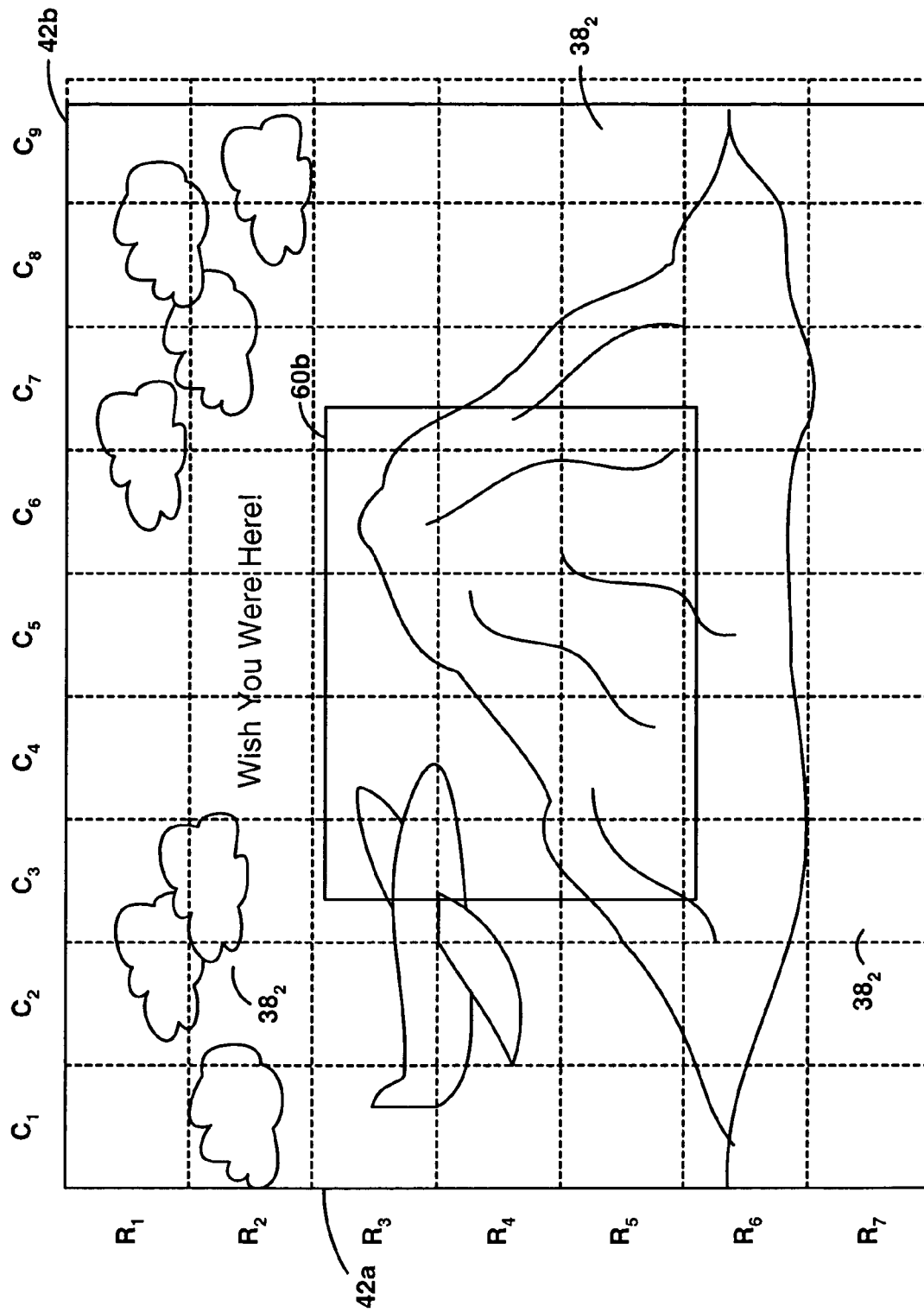
Figure 6C:
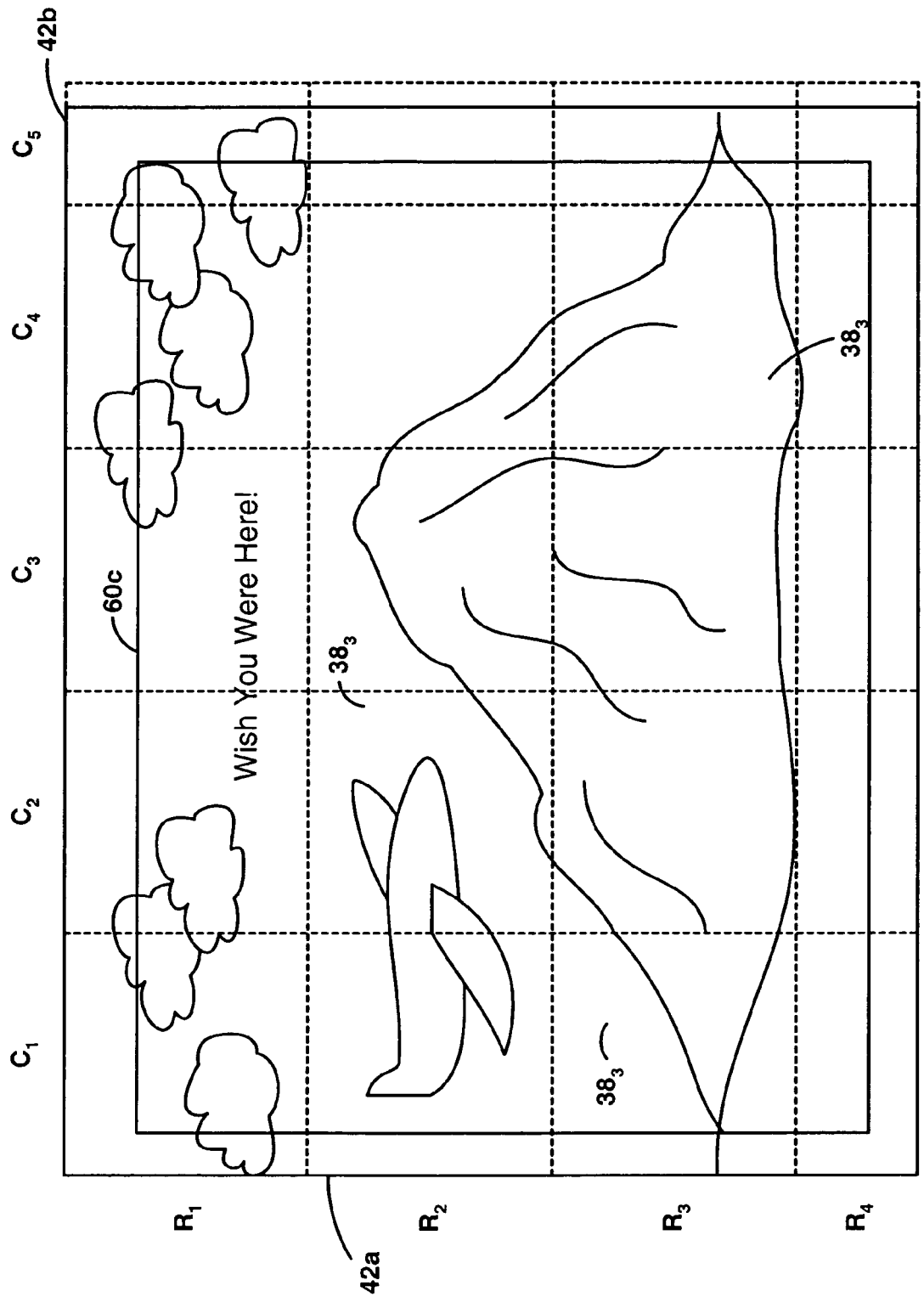

Exemplary tiled representations of a digital image 40 are illustrated in FIGS. 6A-6C. In particular, FIG. 6A illustrates digital image 40 divided into fourteen rows $R_1$-$R_{14}$ and eighteen columns $C_1$-$C_{18}$ of uncompressed tiles $38_1$ at a first resolution (e.g., 1:1), FIG. 6B illustrates digital image 40 divided into seven rows $R_1$-$R_7$ and nine columns $C_1$-$C_9$ of uncompressed tiles $38_2$ at a second resolution (e.g., 1:2), and FIG. 6C illustrates digital image 40 divided into four rows $R_1$-$R_4$ and five columns $C_1$-$C_5$ of uncompressed tiles $38_2$ at a third resolution (e.g., 1:4). Tiles $38_1$, $38_2$ and $38_3$ may be aligned with reference to left and top edges 42a and 42b, respectively, of digital image 40. Persons of ordinary skill in the art will understand that digital image 40 may be divided into additional uncompressed tiles $38_4$, $38_5$, . . . , $38_n$, at additional resolutions.

Figure 7:
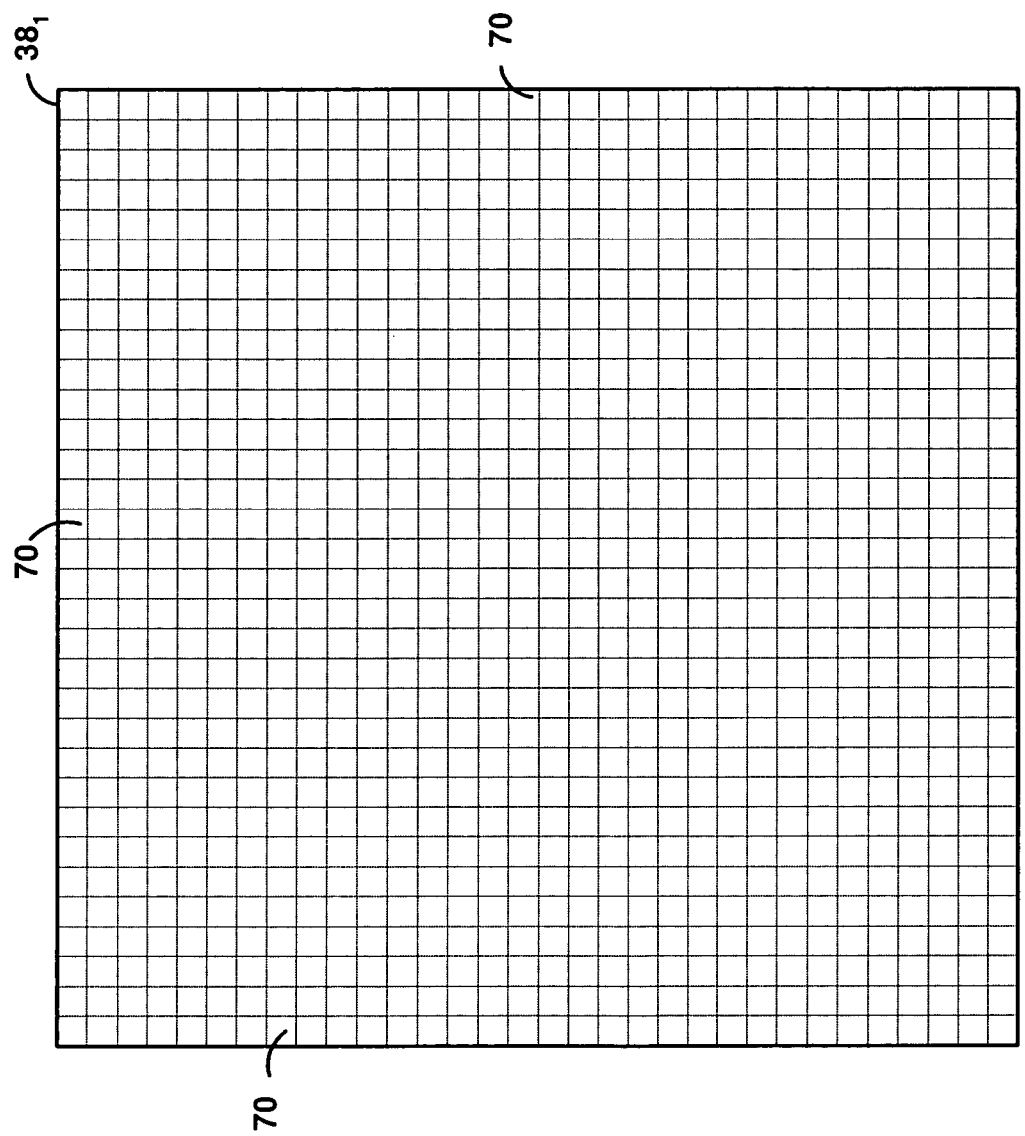
FIG. 7 is an exemplary tile from the tiled representation of FIG. 6A.

Each of tiles $38_1$, $38_2$ and $38_3$ includes a predetermined number of pixels. For example, each of tiles $38_1$, $38_2$ and $38_3$ may include a 256×256 array of pixels. As described above in connection with FIG. 4, during the compression process, pixels in digital image 40 may be grouped into blocks, with each block including a certain number of pixels. For example, as illustrated in FIG. 7, each 256×256 uncompressed tile $38_1$ may include a 32×32 array of blocks 70, with each block 70 including an 8×8 array of pixels. Persons of ordinary skill in the art will understand that tiles $38_1$, $38_2$ and $38_3$ may include more than or less than 256×256 pixels, that the pixels in each tile may be grouped into more than or less than 32×32 arrays of blocks 70, and that each block 70 may include more than or less than 8×8 arrays of pixels.

Figure 8:
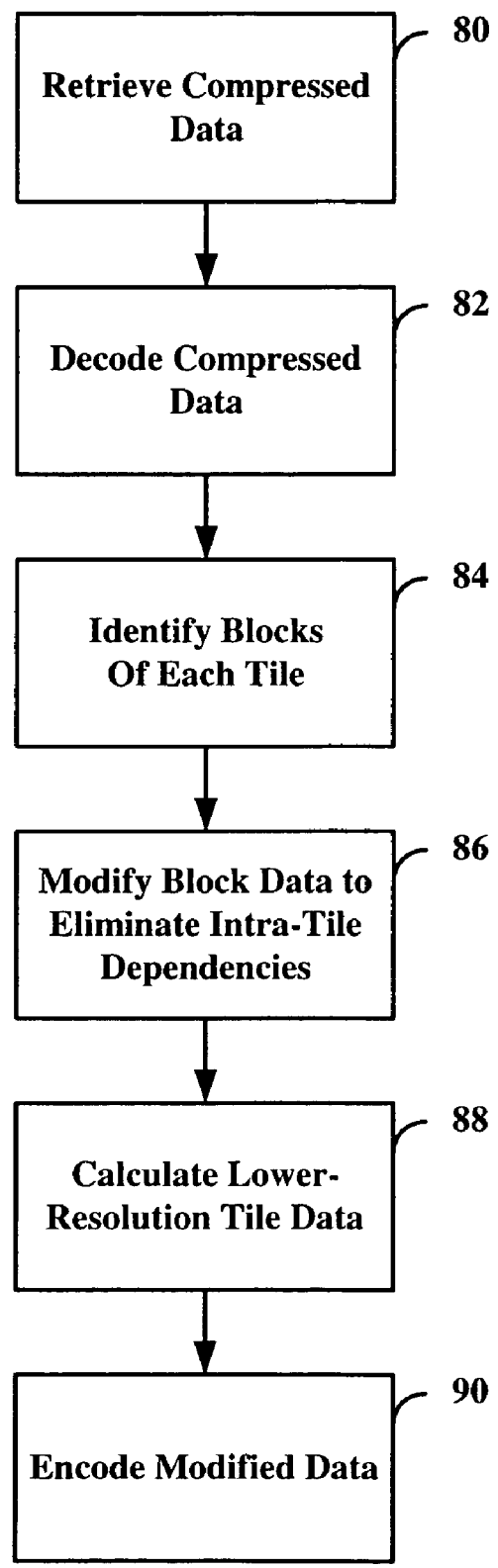
FIG. 8 is an exemplary process for creating compressed image tiles in accordance with this invention.

Referring again to FIG. 2, tile server 30 may create sets of compressed image tiles $38_1'$, $38_2'$, . . . $38_n'$, each of which includes one or more compressed data tiles associated with a corresponding one of uncompressed image tiles $38_1$, $38_2$, . . . , $38_n$, respectively. Referring now to FIG. 8, an exemplary process for creating sets of compressed image tiles $38_1'$, $38_2'$, . . . $38_n'$, is described. Beginning at step 80, tile server 30 retrieves compressed file 24 from memory 26. Next, at step 82, tile server 30 decodes compressed file 24 to recover quantized DCT block data. Next, at step 84, tile server 30 identifies the blocks associated with each full-resolution tile $38_1$. For example, referring to FIG. 6A, tile server 30 determines that the first 32×32 array of blocks is associated with tile $38_1$ at row $R_1$, column $C_1$, the second 32×32 array of blocks is associated with tile $38_1$ at row $R_1$, column $C_2$, and so on. Referring again to FIG. 8, at step 86, tile server 30 modifies block data to eliminate intra-tile dependencies, described in more detail below. At step 88, tile server 30 calculates block data for lower-resolution tiles $38_2$, $38_3$, . . . , $38_n$, based on the modified block data for full-resolution tiles $38_1$. Finally, at step 90, tile server 30 re-encodes the modified block data to create sets of compressed image tiles $38_1'$, $38_2'$, . . . $38_n'$.

Figure 9:
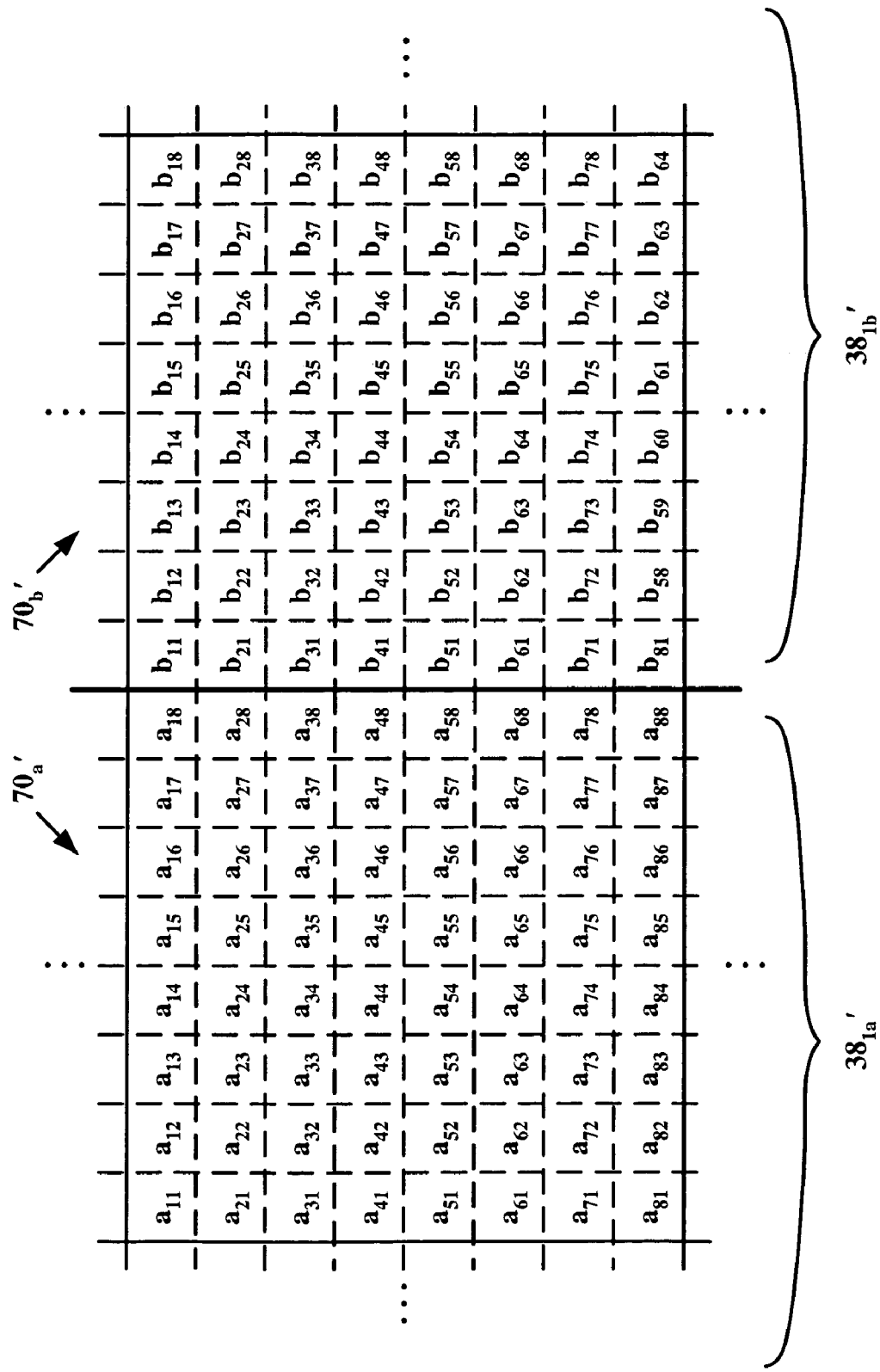
FIG. 9 illustrates exemplary adjacent data blocks from the tiled representation of FIG. 6A.

An example of intra-tile dependencies referred to in connection with step 86 is described with reference to FIG. 9. In particular, FIG. 9 illustrates exemplary adjacent DCT blocks $70_a'$ and $70_b'$, which were recovered by decoding data from compressed file 24. DCT block $70_a'$ is associated with a first compressed image tile $38_{1a}'$, and DCT block $70_b'$ is associated with a second compressed image tile $38_{1b}'$. DCT block $70_a'$ includes an 8×8 array of DCT coefficients $a_{11}$-$a_{88}$, and DCT block $70_b'$ includes an 8×8 array of DCT coefficients $b_{11}$-$b_{88}$. For JPEG-encoded data, the first coefficient in each DCT block 70', referred to as the "DC component" of the block, depends on the DC component of the immediately preceding (i.e., leftmost) DCT block 70' in the same row. In particular, the DC component of a DCT block equals the difference between the actual DC value of the block and the actual DC value of the immediately preceding block. For example, the DC component of DCT block $70_b'$ is coefficient $b_{11}$, and the DC component of DCT block $70_a'$ is coefficient $a_{11}$. Coefficient $b_{11}$ equals the difference between the actual DC value of DCT block $70_b'$ and the actual DC value of DCT block $70_a'$.

Figure 10:
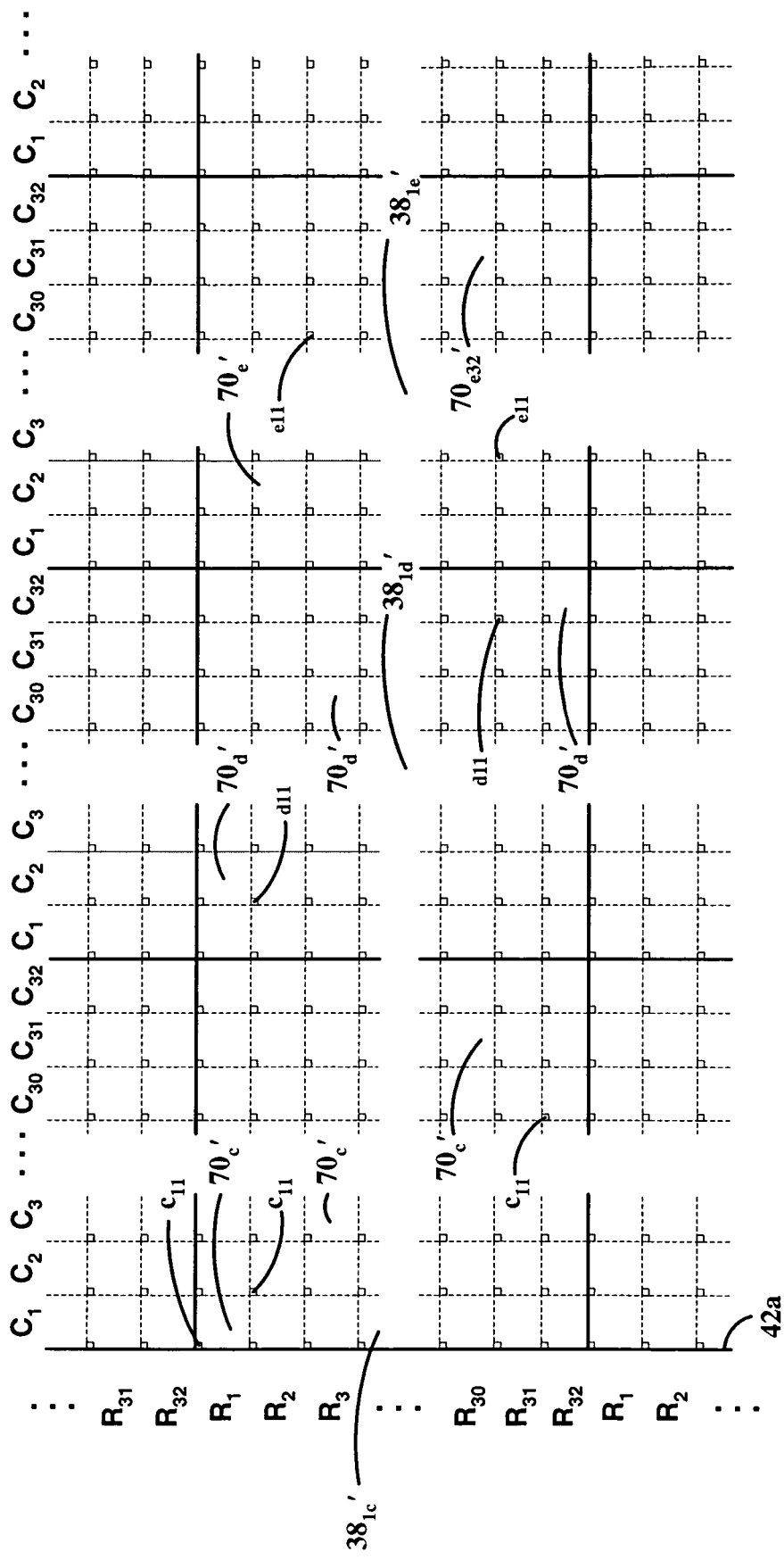
FIG. 10 is a diagram illustrating an exemplary process for eliminating intra-tile dependencies in accordance with this invention.

Thus, to eliminate intra-tile dependencies as specified at step 86 of FIG. 8, tile server 30 scans the recovered block data, row by row, and modifies the DC components of DCT blocks 70' in the first column of each tile to eliminate any dependence on the DC components of corresponding DCT blocks 70' in the immediately preceding tile in the same row. An example of this process is described with reference to FIG. 10. In particular, tile $38_{1c}'$, which is adjacent left edge 42a of digital image 40, includes thirty-two rows $R_1$-$R_{32}$ and thirty-two columns $C_1$-$C_{32}$ of DCT blocks $70_c'$. Tile $38_{1d}'$, which is adjacent tile $38_{1c}'$, includes thirty-two rows $R_1$-$R_{32}$ and thirty-two columns $C_1$-$C_{32}$ of DCT blocks $70_d'$. Similarly, tile $38_{1e}'$, which is adjacent tile $38_{1d}'$, includes thirty-two rows $R_1$-$R_{32}$ and thirty-two columns $C_1$-$C_{32}$ of DCT blocks $70_e'$. DCT blocks $70_c'$, $70_d'$ and $70_e'$ each include DC components (first coefficients) $c_{11}$, $d_{11}$ and $e_{11}$, respectively.

Because no tile precedes tile $38_{1c}'$ in the same row, none of coefficients $c_{11}$ of DCT blocks $70_c'$ in column $C_1$ of tile $38_{1c}'$ require modification. Thus, tile server 30 does not modify any coefficients in tile $38_c'$. Because tile $38_c'$ precedes tile $38_{1d}'$ in the same row, however, tile server 30 modifies the DC components of DCT blocks $70_d'$ of column $C_1$ of tile $38_{1d}'$ to eliminate dependence on the DC components of corresponding DCT blocks $70_c'$ in tile $38_{1c}'$. In particular, for DCT block $70_d'$ in row $R_1$, column $C_1$ of tile $38_{1d}'$, tile server 30 replaces coefficient $d_{11}$ with the actual DC value of the block, which equals the sum of coefficients $c_{11}$ of each block $70_c'$ in row $R_1$ of tile $38_{1c}'$. Similarly, for DCT block $70_d'$ in row $R_2$, column $C_1$ of tile $38_{1d}'$, tile server 30 replaces coefficient $d_{11}$ with the actual DC value of the block, which equals the sum of coefficients $c_{11}$ of each block $70_c'$ in row $R_2$ of tile $38_{1c}'$. This process continues for all other DCT blocks $70_d'$ in column $C_1$ of tile $38_{1d}'$.

After eliminating the dependence of tile $38_{1d}'$ on tile $38_{1c}'$, tile server 30 next modifies tile $38_{1e}'$. Because tile $38_{1d}'$ precedes tile $38_{1e}'$ in the same row, tile server 30 modifies the DC components of DCT blocks $70_e'$ in column $C_1$ of tile $38_{1e}'$ to eliminate dependence on the DC components of corresponding DCT blocks $70_d'$ in tile $38_{1d}'$. In particular, for DCT block $70_e'$ in row $R_1$, column $C_1$ of tile $38_{1e}'$, tile server 30 replaces coefficient $e_{11}$ with the actual DC value of the block, which equals the sum of coefficients $d_{11}$ of each block $70_d'$ in row $R_1$ of tile $38_{1d}'$. Similarly, for DCT block $70_e'$ in row $R_2$, column $C_1$ of tile $38_{1e}'$, tile server 30 replaces coefficient $e_{11}$ with the actual DC value of the block, which equals the sum of coefficients $d_{11}$ of each block $70_d'$ in row $R_2$ of tile $38_{1d}'$. The process continues for all other DCT blocks $70_e'$ in column $C_1$ of tile $38_{1e}'$. Tile server 30 repeats this process for each row of tiles for the entire digital image 40.

Referring again to FIG. 8, at step 88, tile server 30 calculates block data for lower-resolution tiles $38_2, \ldots, 38_n$, based on the modified block data for full-resolution tiles $38_1$. To do so, tile server 30 may calculate block data for tiles $38_2, \ldots, 38_n$ by averaging the modified block data for tiles $38_1$. For example, tile server 30 may calculate block data for tile $38_2$ in row $R_1$, column $C_1$ of FIG. 6B by averaging block data of tiles $38_1$ in rows $R_1$-$R_2$, columns $C_1$-$C_2$ of FIG. 6A. Likewise, tile server 30 may calculate block data for tile $38_2$ in row $R_1$, column $C_2$ of FIG. 6B by averaging block data of tiles $38_1$ in rows $R_1$-$R_2$, columns $C_3$-$C_4$ of FIG. 6A, and so on, until all block data for tiles $38_2$ have been calculated. In a similar fashion, tile server 30 may calculate block data for tile $38_3$ in row $R_1$, column $C_1$ of FIG. 6C by averaging block data of tiles $38_2$ in rows $R_1$-$R_2$, columns $C_1$-$C_2$ of FIG. 6B, and so on, until all block data for tiles $38_3$ have been calculated. Tile server 30 may calculate block data for tiles $38_4, \ldots, 38_n$ in a similar fashion. Referring again to FIG. 8, at step 90, tile server 30 encodes the modified blocks for each set of tiles to create sets of independent compressed data tiles $38_1', 38_2', \ldots, 38_n'$.

Referring again to FIG. 2, after creating sets of independent compressed data tiles $38_1', 38_2', 38_3', \ldots, 38_n'$, tile server 30 may provide the tiles to client 16' for displaying raster data. In particular, to display a portion of uncompressed raster image data, viewer application 32 requests one or more compressed image tiles 38' from tile server 30. In response, tile server 30 sends the requested tiles via communication channel 28, which may be a wired network, wireless network, local area network, wide area network, the Internet or other similar network or combination of such networks. Because each compressed image tile 38' represents only a portion of the original uncompressed raster data, the compressed image tiles are smaller than compressed file 24, and therefore require less time to communicate via communication channel 28.

For example, referring to FIGS. 2 and 6A, viewer application 32 may request compressed image tiles $38_1'$ for displaying portion 60a on display device 34. In response, tile server 30 sends viewer application 32 the compressed image tiles $38_1'$ associated with portion 60a of digital image 40 (i.e., compressed image tiles $38_1'$ in rows $R_6$-$R_9$ and columns $C_7$-$C_{11}$). Viewer application 32 decompresses the received compressed image tiles $38_1'$, and displays the decompressed data on display device 34. In addition, viewer application 32 may store the received compressed image tiles $38_1'$ in cache 36, which may be random access memory ("RAM"), magnetic memory, optical memory, or other similar memory or combination of such memory. Tile server 30 and viewer application 32 therefore may be used to quickly display a portion of decompressed raster data, without requiring image processor 14' to fully decompress compressed file 24, or communicate the entire compressed file to client 16'.

In addition to sending the compressed image tiles $38_1'$ associated with portion 60a, tile server 30 also may send additional compressed image tiles $38_1'$ to viewer application 32. For example, after sending the compressed image tiles $38_1'$ associated with portion 60a, tile server 30 may then begin sending compressed image tiles $38_1'$ that are associated with portions of digital image 40 that immediately surround portion 60a (e.g., compressed image tiles $38_1'$ in rows $R_5$ and $R_{10}$, columns $C_5$-$C_{11}$, and rows $R_1$-$R_6$ of columns $C_6$ and $C_{12}$). Viewer application 32 may store these additional compressed image tiles in cache 36. In this regard, if a user wants to pan across digital image 40 to view areas immediately surrounding portion 60a, viewer application 32 may quickly retrieve from cache 36 compressed image tiles $38_1'$ that are associated with the surrounding areas, decompress the data contained therein, and display the decompressed data on display device 34.

In addition, tile server 30 may send lower-resolution compressed image tiles $38_2', 38_3', \ldots, 38_n'$ to viewer application 32, which may store these additional compressed image tiles in cache 36. Viewer application 32 may utilize the lower-resolution tiles to allow a user to zoom in or out of the image. For example, after viewing portion 60a, a user may wish to zoom out to display portion 60b, and then zoom out again to display portion 60c, and so on. To display a portion 60b or 60c of digital image 40 at a particular resolution, viewer application 32 may then retrieve the compressed image tiles 38' associated with the portion from cache 36, decompresses the retrieved compressed tiles, and display the decompressed data on display device 34.

Tile server 30 may continue sending compressed image tiles 38' of digital image 40 to cache 36 until all remaining compressed image tiles 38' have been sent. At that point, viewer application 32 may quickly retrieve compressed data for any portion and any resolution of digital image 40 directly from cache 36. Thus, tile server 30 and viewer application 32 may be used to quickly display decompressed raster data at multiple resolutions, without requiring that image processor 14' fully decompress compressed file 24, or communicate the entire compressed file to client 16'.

Persons of ordinary skill in the art will understand that the sequence that tile server 30 uses to send compressed image tiles $38_1', 38_2', \ldots, 38_n'$ to viewer application 32 may be changed. For example, if viewer application 32 initially requests compressed image tiles for displaying portion 60c on display device 34, tile server 30 may respond by first sending viewer application 32 the compressed image tiles $38_3'$ associated with portion 60c (i.e., compressed image tiles $38_3'$ in rows $R_1$-$R_4$ and columns $C_1$-$C_5$), then sending compressed image tiles $38_2'$ associated with portion 60b, and finally sending compressed image tiles $38_1'$ associated with portion 60a. In this regard, a user may first display digital image 40 at low resolution, and then progressively zoom in to view portions of the image at higher resolutions.

The foregoing merely illustrates the principles of this invention, and various modifications can be made by persons of ordinary skill in the art without departing from the scope of this invention.

The invention claimed is:

1. A server-based, distributed networked-computer system for processing a compressed image file that describes an image that is grouped into blocks, where each block comprises a predetermined number of pixels, the system comprising:
   a tile server having a network interface for receiving at least one image from an image source and for sending an entirely compressed image to a client computer, wherein said tile server is configured to:
   create an entirely compressed image file from an image, wherein the entirely compressed image is grouped into blocks, where each block comprises a predetermined number of pixels, and wherein the tile server is further adapted to create one or more compressed image tiles comprising an image block with the predetermined number of pixels of the compressed image file, without fully decompressing the entirely compressed image file, the compressed image tile describing a portion of the image represented by said image block; and modify said pixels contained in said image block to eliminate intra-tile dependencies by scanning said pixels contained in said image block row by row; and a client computer having a network interface for receiving an entirely compressed image, wherein said client computer is configured to decompress the compressed image tile and display the portion of the image, without fully decompressing the entirely compressed image file.

2. The system of claim 1, wherein the tile server resides on a print server.

3. The system of claim 1, wherein the entirely compressed image file comprises data compressed according to a block compression standard.

4. The system of claim 3, wherein the block compression standard comprises a Joint Photographic Experts Group compression standard.

5. The system of claim 1, wherein the compressed image tile comprises image data at a first resolution.

6. The system of claim 5, wherein the first resolution comprises full resolution.

7. The system of claim 1, wherein the tile server is configured to create a first compressed image tile and at least one additional compressed image tile based on the entirely compressed image file without fully decompressing the entirely compressed image file, the first compressed image tile describing a first portion of the image, and the at least one additional compressed image tile describing at least one additional portion of the image.

8. The system of claim 7, wherein the first compressed image tile comprises image data at a first resolution, and the at least one additional compressed image tile comprises image data at a second resolution.

9. The system of claim 7, wherein the first compressed image tile may be decompressed without decompressing the at least one additional compressed image tile.

10. A system for processing a compressed image file that describes an image that is grouped into blocks, where each block comprises a predetermined number of pixels, the system comprising:

a print server including:

a network interface for receiving at least one image from an image source and for sending an entirely compressed image to a client computer; and a tile server configured to:

create an entirely compressed image file from an image, wherein the entirely compressed image is grouped into blocks, where each block comprises a predetermined number of pixels, and wherein the tile server is further adapted to create one or more compressed image tiles comprising an image block with the predetermined number of pixels of the compressed image file, without fully decompressing the entirely compressed image file, the compressed image tile describing a portion of the image represented by said image block; and modify said pixels contained in said image block to eliminate intra-tile dependencies by scanning said pixels contained in said image block row by row; and a client computer coupled to the print server via a communication channel, the client computer adapted to receive the compressed image tile from the print server via the communication channel, decompress the compressed image tile and display the portion of the image.

11. The system of claim 10, wherein the entirely compressed image file comprises data compressed according to a block compression standard.

12. The system of claim 11, wherein the block compression standard comprises a Joint Photographic Experts Group compression standard.

13. The system of claim 10, wherein the compressed image tile comprises image data at a first resolution.

14. The system of claim 13, wherein the first resolution comprises full resolution.

15. The system of claim 10, wherein the print server is configured to create first compressed image tile and at least one additional compressed image tile based on the entirely compressed image file without fully decompressing the entirely compressed image file, the first compressed image tile describing a first portion of the image, and the at least one additional compressed image tile describing at least one additional portion of the image.

16. The system of claim 15, wherein the first compressed image tile comprises image data at a first resolution, and the at least one additional compressed image tile comprises image data at a second resolution.

17. The system of claim 15, wherein the first compressed image tile may be decompressed without decompressing the at least one additional compressed image tile.

18. A system for processing a compressed image file that describes an image that is grouped into blocks, where each block comprises a predetermined number of pixels, the system comprising:

a first computer configured to:

create an entirely compressed image file from an image, wherein the compressed image is grouped into blocks, where each block comprises a predetermined number of pixels, and wherein the first computer is further adapted to create one or more plurality of compressed image tiles comprising an image block with the predetermined number of pixels of the compressed image file, without fully decompressing the entirely compressed image file, each compressed image tile describing a corresponding portion of the image represented by said image block; and modify said pixels contained in said image block to eliminate intra-tile dependencies by scanning said pixels contained in said image block row by row; and a second computer configured to decompress the compressed image tiles and display the portions of the image.

19. The system of claim 18, wherein the first computer comprises a print server.

20. The system of claim 18, wherein the second computer comprises a client computer.

21. The system Of claim 18, wherein the first and second computer comprise the same computer.

22. The system of claim 18, wherein the entirely compressed image file comprises data compressed according to a block compression standard.

23. The system of claim 22, wherein the block compression standard comprises a Joint Photographic Experts Group compression standard.

24. The system of claim 18, wherein the compressed image tiles comprise image data at a first resolution.

25. The system of claim 24, wherein the first resolution comprises full resolution.

26. A computer implemented method for processing a compressed image file, stored in a computer memory, that describes an image that is grouped into blocks, where each block comprises a predetermined number of pixels, the method comprising the computer implemented steps of:
   a first computer creating an entirely compressed image file from an image, wherein the compressed image is grouped into blocks, where each block comprises a predetermined number of pixels, and wherein the first computer is further configured to:
      create one or more compressed image tiles comprising an image block with the predetermined number of pixels of the compressed image file, without fully decompressing the entirely compressed image file, the compressed image tile describing a portion of the image represented by said image block; and
      modify said pixels contained in said image block to eliminate intra-tile dependencies by scanning said pixels contained in said image block row by row; and
   a second computer decompressing the compressed image tile and displaying the portion of the image.

27. The method of claim 26, wherein the compressed image file comprises data compressed according to a block compression standard.

28. The method of claim 26, wherein the block compression standard comprises a Joint Photographic Experts Group compression standard.

29. The method of claim 26, wherein the compressed image tile comprises image data at a first resolution.

30. The method of claim 29, wherein the first resolution comprises full resolution.

31. The method of claim 26, wherein creating further comprises creating first compressed image tile and at least one additional compressed image tile based on the entirely compressed image file without fully decompressing the entirely compressed image file, the first compressed image tile describing a first portion of the image, and the at least one additional compressed image tile describing a second portion of the image.

32. The method of claim 30, wherein the first compressed image tile comprises image data at a first resolution, and the at least one additional compressed image tile comprises image data at a second resolution.

33. The system of claim 30, wherein the first compressed image tile may be decompressed without decompressing the at least one additional compressed image tile.

34. A computer implemented method for processing a compressed image file, stored in a computer memory, that describes an image that is grouped into blocks, where each block comprises a predetermined number of pixels, the method comprising the computer implemented steps of:
   a first computer configured to create an entirely compressed image file from an image, wherein the compressed image is grouped into blocks, where each block comprises a predetermined number of pixels, and wherein the first computer is further adapted to:
      create one or more a compressed image tiles comprising an image block with the predetermined number of pixels of the compressed image file, without fully decompressing the entirely compressed image file, the compressed image tile describing a portion of the image represented by said image block; and
      modify said pixels contained in said image block to eliminate intra-tile dependencies by scanning said pixels contained in said image block row by row; and
   a second computer decompressing the compressed image tiles and display the portions of the image.

35. The method of claim 34, wherein the entirely compressed image file comprises data compressed according to a block compression standard.

36. The method of claim 35, wherein the block compression standard comprises a Joint Photographic Experts Group compression standard.

37. The method of claim 34, wherein the compressed image tiles comprise image data at a first resolution.

38. The method of claim 37, wherein the first resolution comprises full resolution.

39. The system of claim 1, said image block comprising block data, said tile server modifying said block data to eliminate intra-tile dependencies.

40. The system of claim 10, said image block comprising block data, said tile server modifying said block data to eliminate intra-tile dependencies.

41. The system of claim 18, said image block comprising block data, said first computer modifying said block data to eliminate intra-tile dependencies.

42. The method of claim 26, said image block comprising block data, said first computer modifying said block data to eliminate intra-tile dependencies.

43. The method of claim 34, said image block comprising block data, said first computer modifying said block data to eliminate intra-tile dependencies.

44. A system for processing a compressed image file that describes an image that is grouped into blocks, where each block comprises a predetermined number of pixels, the system comprising:
   a print server configured to create an entirely compressed image file from an image, wherein the compressed image is grouped into blocks, where each block comprises a predetermined number of pixels, and wherein the print server is further adapted to:
      create a first and at least one additional compressed image tiles comprising an image block with the predetermined number of pixels of the entirely compressed image file, without fully decompressing the compressed image file, the first compressed image tile describing a first portion of the image represented by said image block, and the at least one additional compressed image tile describing at least one additional portion of the image represented by said image block, wherein the first compressed image tile may be decompressed without decompressing the second compressed image tile, and
      modify said pixels contained in said image block to eliminate intra-tile dependencies by scanning said pixels contained in said image block row by row; and
   a second computer configured to decompress the compressed image tile and display the first portion of the image, wherein the print server sends the first compressed image tile to the second computer, and wherein the second computer decompresses and displays the first portion of the image;
   wherein after the second computer displays first compressed image tile, the print server sends the at least one additional compressed image file to the second computer, wherein the at least one additional compressed image file comprises a block that borders the first compressed image file.

* * * * *